(12) United States Patent
Sawai et al.

(10) Patent No.: US 8,326,531 B2
(45) Date of Patent: Dec. 4, 2012

(54) MAP UPDATE DATA SUPPLY APPARATUS, MAP DATA UPDATE SYSTEM, AND MAP UPDATE DATA SUPPLY METHOD

(75) Inventors: Kimiyoshi Sawai, Okazaki (JP); Hironobu Sugimoto, Toyota (JP); Tomoki Kodan, Nagoya (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 559 days.

(21) Appl. No.: 12/449,658

(22) PCT Filed: Mar. 31, 2008

(86) PCT No.: PCT/JP2008/056836
§ 371 (c)(1),
(2), (4) Date: Aug. 20, 2009

(87) PCT Pub. No.: WO2008/123618
PCT Pub. Date: Oct. 16, 2008

(65) Prior Publication Data
US 2010/0030460 A1 Feb. 4, 2010

(30) Foreign Application Priority Data
Mar. 29, 2007 (JP) .............................. 2007-087713

(51) Int. Cl.
*G01C 21/30* (2006.01)

(52) U.S. Cl. ........ 701/450; 701/400; 701/408; 701/409; 701/410; 701/411; 701/451; 701/452; 701/453; 701/454

(58) Field of Classification Search ...................... None
See application file for complete search history.

(56) References Cited

U.S. PATENT DOCUMENTS

| | | | |
|---|---|---|---|
| 6,937,936 B2 * | 8/2005 | Nimura | 701/421 |
| 7,330,788 B2 * | 2/2008 | Mikuriya et al. | 701/450 |
| 7,831,383 B2 * | 11/2010 | Oohashi | 701/452 |
| 2002/0091485 A1 * | 7/2002 | Mikuriya et al. | 701/208 |
| 2003/0220735 A1 * | 11/2003 | Nimura | 701/208 |
| 2005/0049784 A1 * | 3/2005 | Ikeuchi et al. | 701/208 |
| 2007/0126605 A1 * | 6/2007 | Aleksic et al. | 340/995.14 |

FOREIGN PATENT DOCUMENTS

| | | |
|---|---|---|
| DE | 10 2005 045 020 A1 | 3/2007 |
| EP | 1 909 068 A2 | 4/2008 |
| JP | A-2002-279437 | 9/2002 |
| JP | A-2003-194551 | 7/2003 |
| JP | A 2004-178248 | 6/2004 |
| JP | A-2004-271576 | 9/2004 |
| WO | WO 2005/019773 A1 | 3/2005 |

OTHER PUBLICATIONS

Japanese Patent Office, Notification of Reason(s) for Refusal mailed Sep. 8, 2011 in Japanese Patent Application No. 2007-087713 w/Partial English-language Translation.

* cited by examiner

Primary Examiner — Khoi Tran
Assistant Examiner — Jonathn L Sample
(74) Attorney, Agent, or Firm — Oliff & Berridge, PLC

(57) ABSTRACT

A map update data supply apparatus includes: isolation detection means for detecting the presence and the absence of an isolated state in which some of the roads are isolated from other roads in a road network of target map data due to updating of one or more update target segments of the target map data based on update map data; extraction means for extracting, as update required segments, segments of the update map data, other than the update target segments, that have a road that connects to the isolated some of the roads when it is detected that there is the isolated state; and update data file generating means for generating update data files for the update target segments and the update required segments based on the update map data.

7 Claims, 9 Drawing Sheets

MAP UPDATE DATA SUPPLY APPARATUS, MAP DATA UPDATE SYSTEM, AND MAP UPDATE DATA SUPPLY METHOD

TECHNICAL FIELD

The present invention relates to a map update data supply apparatus that supplies an update data file for each segment of target map data that includes information for at least a road network and that is partitioned into a plurality of segments, a map data update system that uses this map update data supply apparatus, and a map update data supply method.

BACKGROUND ART

There is a known technology in which the content of map data, such as road maps that are used in a navigation apparatus, are partially updated. For example, the apparatus described in Japanese Patent Application Publication No. JP-A-2004-178248 has a structure in which, with respect to a newly constructed road, a data set table is provided that contains a series of link numbers that structure the newly constructed road, in order to maintain the newly constructed road up to points where it links with existing trunk roads as one data set. In addition, in the case where there is an update request for a portion of the segments of the map data, which is partitioned into a plurality of segments, from the navigation apparatus, and in the case where the newly constructed road that is contained in the data set table extends outside the segment for which the update request has been made, the update information for the entire newly constructed road is supplied to the navigation apparatus by referring to the data set table.

Thus, even in the case where update information is supplied for a portion of the segments of the map data that is designated by the navigation apparatus, it is possible to prevent the newly constructed road from being cut off between adjacent segments, and it is possible to ensure that the newly constructed road is connected to the existing trunk road. Therefore, searching for routes that run along the newly constructed road is possible even after the updating of a portion of the segments.

However, inconveniences related to map data that occur due to the updating of a portion of the segments are not limited to those related to newly constructed roads as described above. For example, there may be a case in which an existing road other than a newly constructed road is isolated from other roads. More specifically, as one example, a case will be explained in which, updating of the map data on the map update data supply apparatus side is carried out such that a road (referred to as "road B") that provides the only connection to a given road (referred to as "road A") is deleted, and a road (referred to as "road C") that is connected to the road A is added in a segment that is different from the segment including the deleted road B. In such a case, when the updating of a portion of the segments of the map data on the navigation apparatus side is carried out, if the segment including the deleted road B is assigned as an update target segment and the entire added road C is not included in the update target segment, the road A is isolated and disconnected to any road after updating the map data. In the case where the map data is brought into such a state due to updating, the route search cannot be carried out appropriately when the isolated road is set as the departure point or the destination point, which is a problem.

DISCLOSURE OF THE INVENTION

In consideration of the problem described above, it is an object of the present invention to provide: a map data supply apparatus that is structured such that, when an update data file is supplied for a portion of the segments of map data as update target, it can prevent some of the roads from becoming isolated from other roads in the road network of the map data after updating by the update data file, and ensure a state in which the search for a route that includes the some of the roads is possible; a map data update system that uses the map update data supply apparatus; and a map update data supply method.

In order to attain the above-described object, a map update data supply apparatus according to the present invention is provided that supplies an update data file for each segment of target map data that includes information for at least a road network and that is partitioned into a plurality of segments. The characteristic structure of the map update data supply apparatus resides in that it includes: an update map database that stores update map data that is partitioned into a plurality of segments in a similar manner to the target map data; isolation detection means for detecting presence and absence of an isolated state in which some of roads are isolated from other roads in the road network of the target map data due to updating of one or more update target segments in the target map data based on the update map data; extraction means for extracting, as update required segments, segments of the update map data, other than the update target segments, that have a road that is connected to the isolated some of the roads when it is detected that there is the isolated state; and update data file generating means for generating update data files for the update target segments and the update required segments based on the update map data.

Note that in the present application, the expression "a state in which some of the roads have become isolated from other roads (isolated state)" denotes a state in which one road or two or more roads that form a closed-circuit route, as some of the roads, are not connected to other roads in the vicinity.

According to this characteristic structure, segments of the update map data, other than the update target segments, that include a road that is connected to the isolated some of the roads are extracted as update required segments, when some of the roads are isolated from other roads in the road network of the target map data due to updating of one or more update target segments in the target map data based on the update map data. Then, the update data files are generated also for the update required segments, in addition to the update target segments in the target map data, based on the update map data. Therefore, it is possible to prevent some of the roads from becoming isolated from other roads in the target map data after being updated by this update data file. Thus, it is possible to ensure a state in which it is possible to search for the route that includes the some of the roads.

Here, it is advantageous to adopt a structure in which, when there is a deletion of a road in an update content of the update map data for the target map data, the isolation detection means detects, on the update target segments, the presence and the absence of the isolated state in relation to a road that was connected to the deleted road.

Normally, an isolated state of a portion of the roads that is caused by the updating of the target map data occurs in relation to a road that was connected to a road that has been deleted due to the updating of the target map data and in relating to one or more roads that form a closed-circuit route along with the road. Therefore, according to this structure, it is possible to effectively detect the presence and the absence of the isolated state of some of the roads due to the updating of the target map data.

Further, at this time, it is advantageous to adopt a structure in which the isolation detection means detects the isolated state such that a search for a route that connects one end of the deleted road and the other end thereof is carried out in a state that corresponds to a state after the update target segments in the target map data have been updated based on the update map data, and when the route does not exist, the presence of an isolated state is detected.

According to this structure, it is possible to reliably detect the presence and the absence of the isolated state in relation to a road that is connected to the road that has been deleted due to the updating of the target map data.

Further, it is advantageous to adopt a structure in which, when there is an addition of a road in the update content of the update map data for the target map data, the extraction means extracts the update required segments from among segments that include the added road.

Normally, in the update map data that reflects the actual state of the roads, some of the roads in the road network are not in an isolated state, and in the case where the deletion of a road that is connected to the some of the roads has occurred, it is expected that a road will be newly added to replace the deleted road. Thus, when an isolated state of some of the roads has occurred due to the updating of the update target segments in the target map data, there is a high probability that a road that connects to the isolated road(s) has been newly added to segments other than the update target segments. According to this structure, in the case where it has been detected that the isolated state exists, because update required segments are extracted from among one or more segments that include the newly added road, it is possible to efficiently extract the segments of the update map data, other than the update target segments, that have a road that is connected to the isolated some of the roads.

Further, in this context, it is advantageous to adopted a structure in which the extraction means extracts the update required segments such that the search for the route that connects one end of the deleted road to the other end thereof is carried out in a state that corresponds to a state after the update target segments in the target map data and at least one segment that includes the added road have been updated based on the update map data, and when there is a route that passes along the added road, segments that include the added road that structures the route are extracted as update required segments.

According to this structure, it is possible to reliably detect the update required segments that have a road that is connected to the isolated some of the roads.

Moreover, the characteristic structure of a map data update system according to the present invention resides in that it includes the map update data supply apparatus having the above-described characteristic structure and a navigation apparatus, and the navigation apparatus includes: a navigation map database that stores navigation map data serving as the target map data; update request generating means for generating an update request data file for the update target segments; update data file acquiring means for acquiring the update data files supplied from the map update data supply apparatus; and map data updating means for updating the navigation map data based on the update data files.

According to this characteristic structure, update request data for the update target segments for which the updating of the navigation map data is necessary is transmitted from the navigation apparatus side, and based on the update request data, it is possible to carry out the updating of the navigation map data using the update data files supplied from the map data supply apparatus. Thus, at the navigation apparatus side, the update data files are received for the update target segments and the update required segments for which updates are necessary in order to prevent some of the roads from becoming isolated from other roads in accordance with the updating of the update target segments, and it is possible to update some of the segments of the navigation map data. Therefore, it is possible to update the necessary minimum number of segments of the navigation map data, and in comparison to the case in which all of the navigation map data is updated, it is possible to reduce the amount of communication data and communication cost when transmitting and receiving the update data files to a low level.

Furthermore, a map update data supply method according to the present invention is provided that supplies an update data file for each segment of target map data that includes information for at least a road network and that is partitioned into a plurality of segments. The characteristic structure of the map update data supply method resides in that it executes: an isolation detection step of detecting presence and absence of an isolated state in which some of roads are isolated from other roads in the road network of the target map data due to updating of one or more update target segments in the target map data based on the update map data; an extraction step of extracting, as update required segments, segments of the update map data, other than the update target segments, that have a road that is connected to the isolated some of the roads when it is detected that there is the isolated state; and an update data file generating step of generating update data files for the update target segments and the update required segments based on the update map data.

According to this characteristic structure, in the case where some of the roads have become isolated from other roads in the road network of the update map data due to the updating of one or more update target segments in the target map data based on the update map data, segments of the update map data, other than the update target segments, that have a road that is connected to the isolated some of the roads are extracted as update required segments. Then, update data files are generated also for the update required segments in addition to the update target segments in the target map data, based on the update map data. Therefore, it is possible to prevent some of the roads from becoming isolated from other roads in the update map data after being updated by the update data file. Thus, it is possible to ensure a state in which a search for a route that includes the some of the roads is possible.

Here, it is advantageous to adopt a structure in which, about the update target segments, when there is a deletion of a road in the update content of the update map data for the target map data, the isolation detection step carries out a search for a route that connects one end of the deleted road and the other end thereof in a state that corresponds to a state after the update target segments in the target map data have been updated based on the update map data, and detects that there is the isolated state in the case where the route does not exist.

According to this structure, it is possible to efficiently and reliably detect the presence and the absence of the isolated state of the some of the roads due to the updating of the target map data.

Furthermore, it is advantageous to adopt a structure in which, when there is an addition of a road in the update content of the update map data for the target map data, the extraction step carries out a search for a route that connects one end of the deleted road and the other end thereof in a state that corresponds to a state after the update target segments in the target map data and at least one segment that includes the added road have been updated based on the update map data, and when the route that passes along the added road is present, the extraction step extracts segments that include the added road that structures the route as update required segments.

According to this structure, because the update required segments are extracted from among one or more segments that include the newly added road when it is detected that there is the isolated state, it is possible to efficiently and reliably extract segments of the update map data, other than the update target segments, that have a road that is connected to the isolated some of the roads.

BEST MODES FOR CARRYING OUT THE INVENTION

Figure 1:
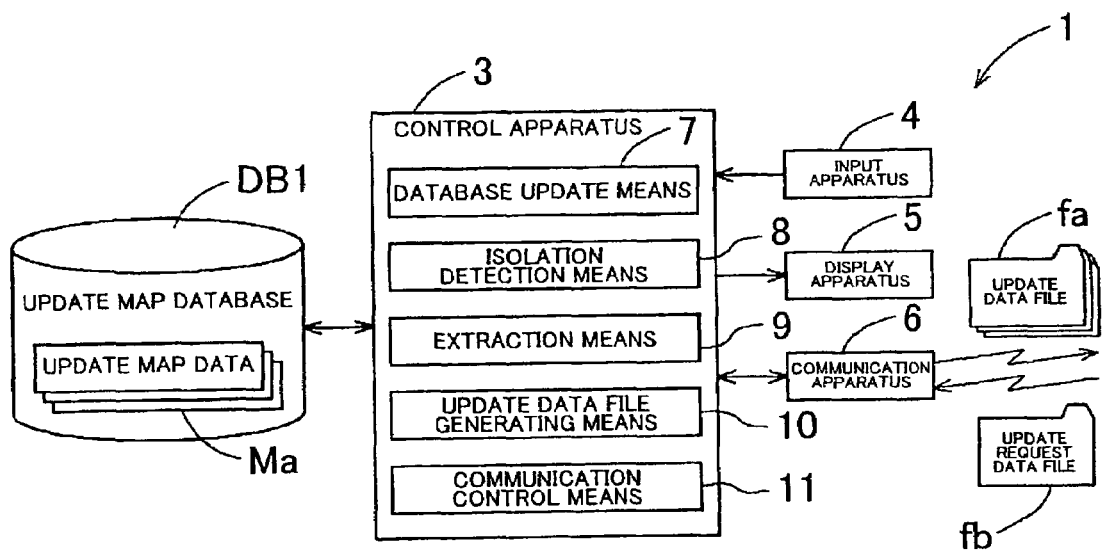
FIG. 1 is a block drawing that shows the structure of a map update data supply apparatus according to an embodiment of the present invention.
Figure 2:
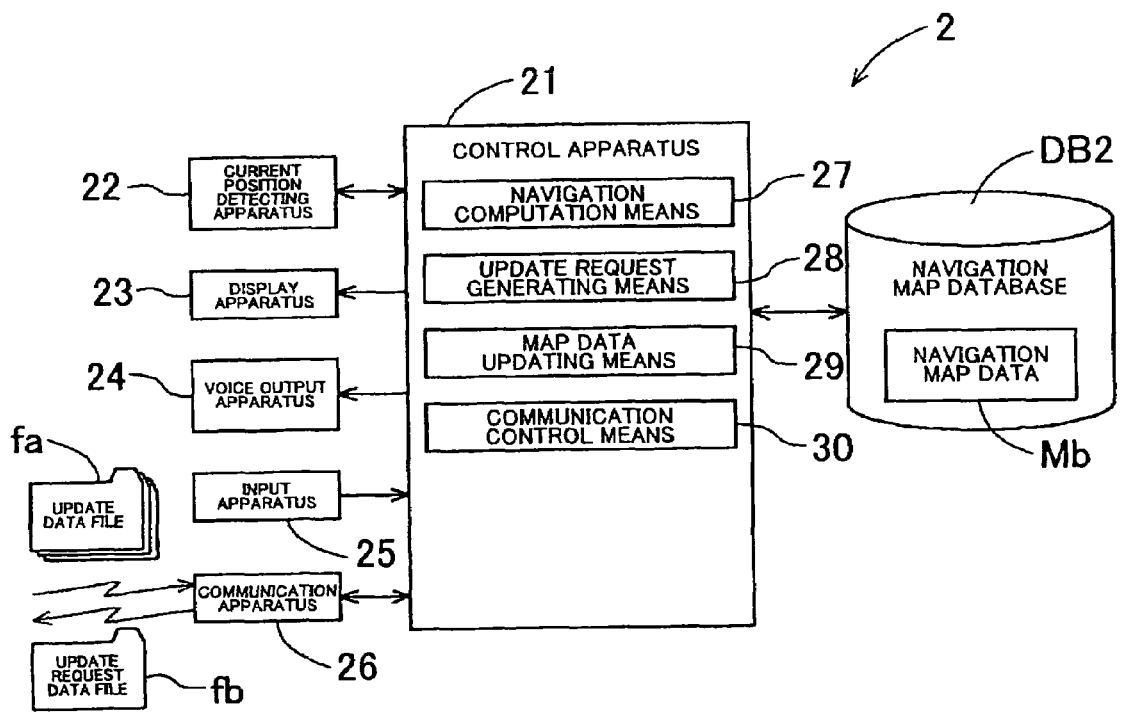
FIG. 2 is a block diagram that shows the structure of a navigation apparatus according to the embodiment of the present invention.

An embodiment of the present invention will be explained with reference to the drawings. FIG. 1 is a block diagram that schematically shows the structure of a map update data supply apparatus 1 according to the embodiment. FIG. 2 is a block diagram that schematically shows the structure of a navigation apparatus 2 according to the embodiment. In the embodiment, the map update data supply apparatus 1 and the navigation apparatus 2 are respectively provided with communication apparatuses 6 and 26 so as to enable transmission and reception of data via various communication networks, thereby structuring a map data update system as a whole. In addition, the map update data supply apparatus 1 supplies an update data file fa for updating navigation map data Mb to the navigation apparatus 2. The navigation apparatus 2 that has received the supply of the update data file fa carries out the update of the navigation map data Mb based on the update data file fa. Specifically, in this embodiment, the navigation map data Mb for the navigation apparatus 2 corresponds to "target map data" in the present invention. Hereinafter, the structure of the map update data supply apparatus 1 and the navigation apparatus 2 according to the embodiment will be explained in detail.

1. Map Update Data Supply Apparatus 1

As shown in FIG. 1, the map update data supply apparatus 1 is provided with an update map database DB1, a control apparatus 3, an input apparatus 4, a display apparatus 5, and a communication apparatus 6. The control apparatus 3 is provided with database update means 7, isolation detection means 8, extraction means 9, update data file generating means 10, and communication control means 11. Here, the control apparatus 3 is structured by being provided with an arithmetic processing apparatus such as a CPU, and a recording medium such as a RAM or a ROM for storing software (program), data, and the like. In addition, each of the means 7 to 11 provided in the control apparatus 3 is structured such that the arithmetic processing apparatus of the control apparatus 3 serves as the central member, and a functional unit for carrying out various processing on input data is provided by hardware, software, or both of them. In addition, the update map database DB1 is stored in a recording medium that can be overwritten, such as a hard disk drive or a flash memory. Hereinafter, the structure of each unit of the map update data supply apparatus 1 will be explained in sequence.

1-1. Update Map Database DB1

Figure 3:
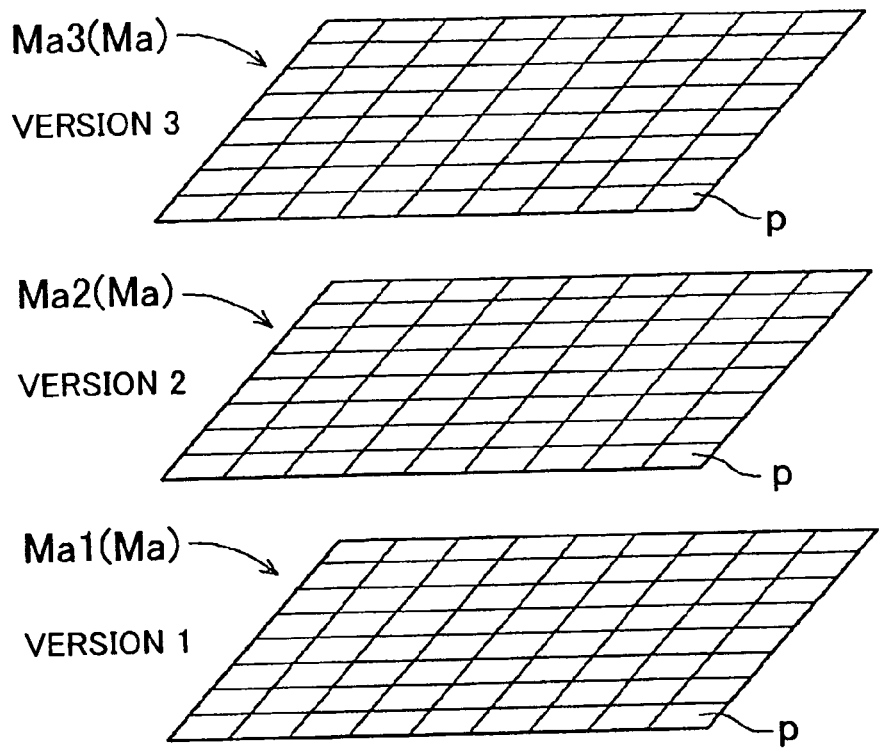
FIG. 3 is an explanatory drawing for explaining the structure of update map data.

FIG. 3 is an explanatory drawing for explaining the structure of update map data Ma that is stored in the update map database DB1. As shown in FIG. 3, in the update map database DB1, the update map data Ma, which is partitioned into a plurality of segments p, is stored so as to include a plurality of update versions. In this example, the oldest update map data Ma, which was created first, is set to version 1, the versions are upgraded sequentially to version 2 and then to version 3 each time the update map data Ma is updated based on new information, and the three update versions of the update map data Ma are stored in the update map database DB1 at the current point of time. Note that, in the explanation of the embodiment of the present invention, in the case where the versions 1 to 3 of the update map data Ma are to be distinguished, the reference numerals Ma1 to Ma3, to which the version number has been attached, are used as reference numerals for the update map data, for example, in the expression "version 1 of the update map data Ma1". In contrast, simply referring to "update map data Ma" denotes all of the versions of the update map data Ma1 to Ma3 together. In addition, in the explanation of the embodiment of the present invention, referring to "segments p" denotes a plurality of segments of the update map data Ma and the navigation map data Mb (which will be described later) together. In the case where a single segment is to be indicated, segment numbers such as segment 1, segment 2, and the like (refer to FIG. 5 to FIG. 8) will be used. In addition, as will be described later, the segment that is specifically selected from among the plurality of segments p is denoted by "update target segment pa" or "update required segment pb".

Figure 4:
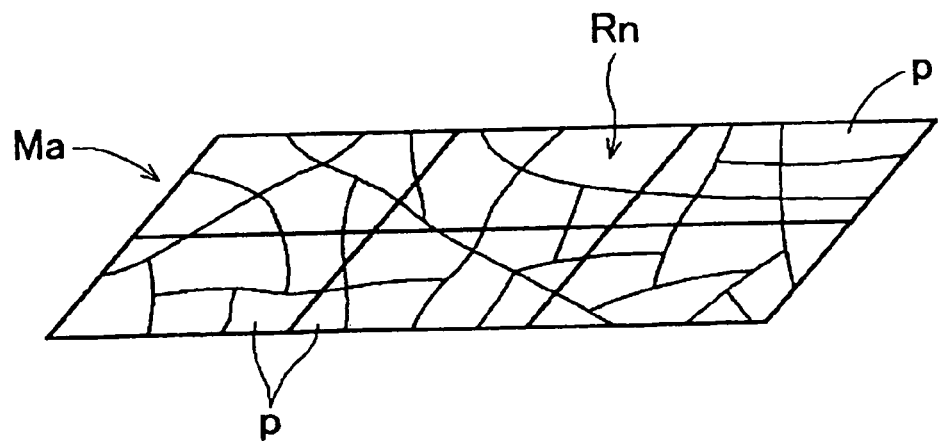
FIG. 4 is an explanatory drawing for explaining the content of the information that is included in the update map data.

In this example, the plurality of segments p that form the update map data Ma are partitioned so as to form rectangles in which each of the segments p has the same size. For example, in the case that the map data for all areas of Japan is the target, the update map data Ma has a range that includes all areas of Japan as a whole, and these are partitioned into m×n (where m and n are natural numbers) to form each of the segments p. Each of the segments p in the update map data Ma is provided so as to correspond to the segment p of the lowest layer 1 of the navigation map data Mb, which will be described later. FIG. 4 is an explanatory drawing for explaining the content of the information that is possessed by the update map data Ma. As shown in FIG. 4, the update map data Ma includes information about a road network Rn that represents a connection relationship of roads, by links that correspond to a plurality of roads that are present within each segment p and extend between a plurality of segments p, and by nodes that correspond to intersections. Further, although not shown in the figures, in addition to the information about the road network Rn, the update map data Ma includes information about the layout and shape of various features, such as road signs and traffic signals etc. that are provided along the road, constructed objects such as architectural structures (houses, buildings etc.), bridges and tunnels etc., natural objects such as rivers and coastlines etc., and administrative districts etc. However, in order to simplify the explanation below, an explanation will be given for information about the road network Rn that is particularly important from among information as maps included in the update map data Ma and the navigation map data Mb.

1-2. Input Apparatus 4, Display Apparatus 5, and Communication Apparatus 6

Next, returning to FIG. 1, the input apparatus 4, the display apparatus 5, and the communication apparatus 6 of the map update data supply apparatus 1 will be explained. The input apparatus 4 includes various input devices, such as a keyboard, a mouse, a touch panel, and a scanner etc. An operator can use this input apparatus 4 to carry out input operation etc. for the updating, such as the adding, the changing, and the deleting of map information in order to upgrade the version of the update map data Ma. The display apparatus 5 is structured by including a liquid crystal display, a CRT display or the like. When the operator carries out an operation using the input apparatus 4, the display apparatus 5 can display the state of the update map data Ma and the content of the update operation thereof. The communication apparatus 6 is structured so as to enable the carrying out of the transmission and reception of data by communicating with a communication apparatus 26 of the navigation apparatus 2 via various well-known fixed-line and wireless communication networks. For example, the Internet, a fixed-line or wireless public telephone network, a fixed-line or wireless LAN (Local Area Network), or a dedicated circuit can be used as such a communication network.

1-3. Control Apparatus 3

As described above, the control apparatus 3 is provided with the database update means 7, the isolation detection means 8, the extraction means 9, the update data file generating means 10, and the communication control means 11. Here, the database update means 7 is means for carrying out the processing of the input operation for the updating, such as the adding, the changing, and the deleting of the map data by using the input apparatus 4 in order to upgrade the version of the update map data Ma, and the processing of the generation of a new version of the update map data Ma based on the input operation for the updating, and the storing of the update map data Ma in the update map database DB1. Due to the processing by the database update means 7, the update map data Ma in the update map database DB1 is appropriately updated in conformity with the current situation. Each time the update map data Ma is updated by the database update means 7, a new version of the update map data Ma for each of the segments p is stored in the update map database DB1.

The isolation detection means 8 is means for detecting the presence or the absence of an isolated state that occurs due to updating of one or more of the update target segments pa of the navigation map data Mb based on the update map data Ma before the generation of the update data file fa by the update data file generating means, which will be described later. Here, the isolated state denotes a state in which some of the roads are isolated from other roads in the road network Rn (refer to FIG. 4), or a state in which one road (as some of the road), or two or more roads (as some of the roads) that form a closed-circuit route are not connected to other roads in the vicinity. In other words, a state in which there is no isolated state is a state in which a route that connects a departure point and a destination point exists at no matter which position in the road network Rn the departure point and the destination point are set. Note that an update target segment pa is a segment p that becomes an update target of the navigation map data Mb designated by an update request data file fb from the navigation apparatus 2, which will be described later.

Figure 5:
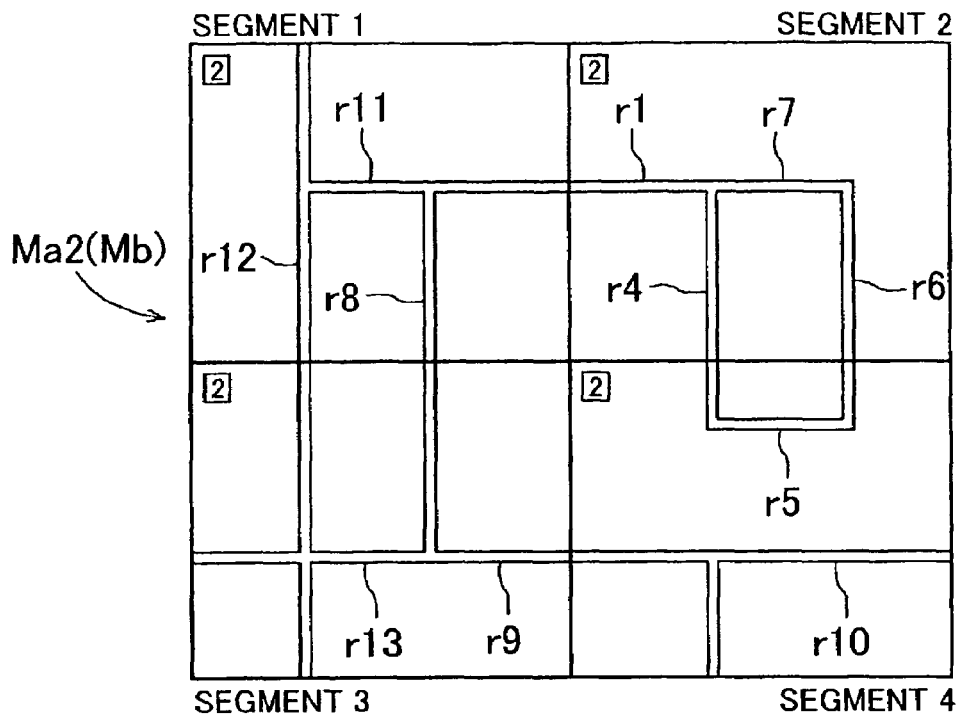
FIG. 5 is a drawing that shows the state of the road network in the map data having an update state that is the same as that of the navigation map data.
Figure 6:
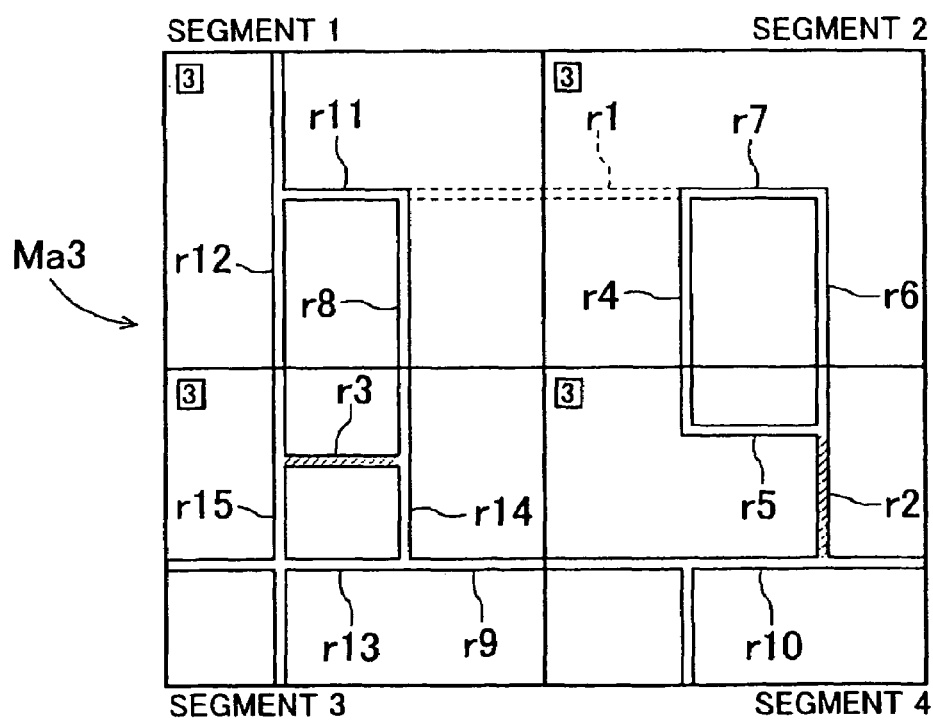
FIG. 6 is a drawing that shows the state of the road network in the newest version of the update map data.
Figure 7:
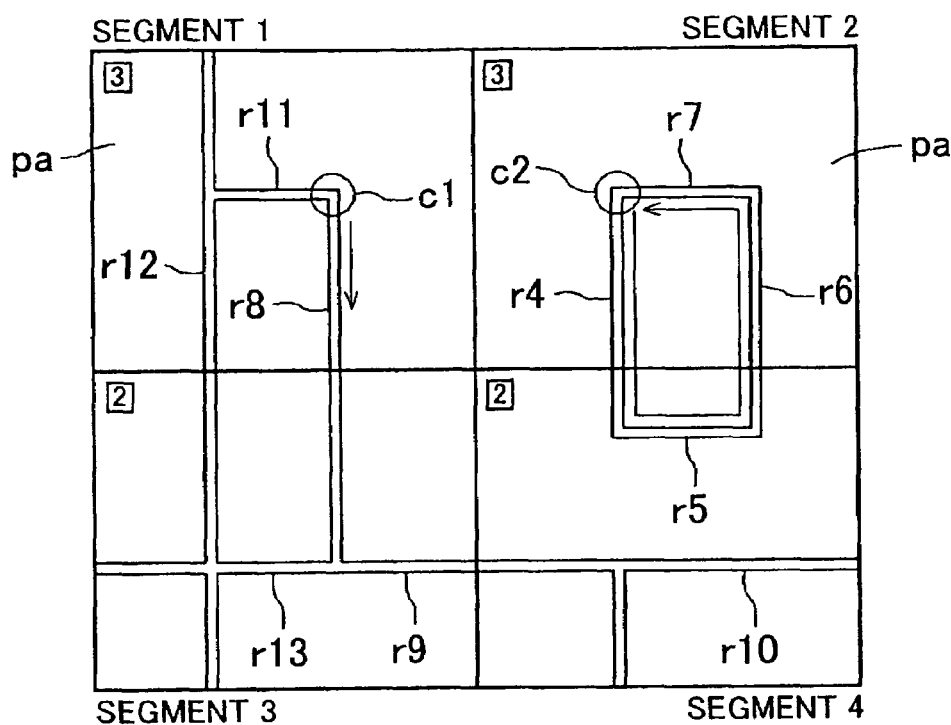
FIG. 7 is a drawing that shows the state of the road network in the map data having a state that corresponds to the state after the updating of the update target segments in the navigation map data.

Here, the isolated state of some of the roads will be explained using the example of the road network Rn that is shown in the map data in FIG. 5 to FIG. 7. FIGS. 5 to 7 show various states of map data for the road network Rn in segments 1 to 4 based on a plurality of update versions of the update map data Ma stored in the update map database DB1. Specifically, FIG. 5 shows an example of the road network Rn for the case in which all of the segments 1 to 4 are version 2, and FIG. 6 shows an example of the road network Rn for the case in which all of the segments are version 3. Further, FIG. 7 shows an example of the road network Rn for the case in which only segments 1 and 2 have been updated to version 3, and segments 3 and 4 are maintained at version 2. Note that, in these figures, the numerals that are enclosed in the squares show the update version for each of the segments p. In the road network Rn that is shown in these figures, a circuit r4-7 that is formed by roads r4 to r7 is connected to other roads, by the road r1 in the version 2 of the road network Rn that is shown in FIG. 5, and by the road r2 in the version 3 of the road network Rn that is shown in FIG. 6, and thus they are not in an isolated state. In contrast, in the road network Rn that is shown in FIG. 7, an isolated state occurs in which the circuit r4-7 forms a closed-circuit route and is not connected to any other neighboring road. The isolation detection means 8 carries out processing for detecting such an isolated state.

Normally, the isolated state of some of the roads due to the updating of the navigation map data Mb occurs in relation to a road that was connected to a road that has been deleted by the updating of the navigation map data Mb or in relation to one or more roads that form a closed-circuit route together with the road that was connected to the deleted road. Thus, the isolation detection means 8 carries out the detection, in the update target segments pa, of the presence and the absence of an isolated state in relation to a road that was connected to the deleted road in the case where there has been a deletion of a road in the update content of the newest version of the update map data Ma for the navigation map data Mb. At this time, the isolation detection means 8 carries out a search for the route (below, referred to as the "connecting route k" (refer to FIG. 8)) that connects one end of the deleted road and the other end thereof in a state that corresponds to the state after the update target segments pa of the navigation map data Mb have been updated based on the newest version of the update map data Ma, and detects that there is an isolated state in the case where the connecting route k does not exist. Note that the detection processing method for the isolated state by this isolation detection means 8 will be described below in detail with reference to the flowchart shown in FIG. 11.

The extraction means 9 is means for extracting, as update required segments pb, segments p in the update map data Ma, other than the update target segments pa, that include a road that is connected to the isolated some of the roads in the case where the isolation detection means 8 has detected that there is an isolated state. Specifically, the extraction means 9 carries out processing in which update required segments pb are extracted as segments p for which an update must be carried out in order to prevent an isolated state of some of the roads that may occur in accordance with the updating of the update target segments pa designated by the update request data file fb from the navigation apparatus 2.

Normally, in the update map data Ma that reflects the actual state of the roads, some of the roads in the road network Rn are not in an isolated state, and in the case where a deletion of a road that is connected to the some of the roads is carried out, it is expected that a road that replaces the deleted road is newly added. Thus, in the case where the isolated state of some of the roads has occurred due to the updating of the update target segments pa of the navigation map data Mb, there is a high probability that a road that connects the isolated road(s) is newly added to a segment p, other than the update target segments pa. Thus, when the isolation detection means 8 has detected that there is an isolated state, and when there is an addition of a road in the updated contents of the newest version of the update map data Ma for the navigation map data Mb, the extraction means 9 carries out processing in which update required segments pb are extracted from among the segments p that include the added road.

Figure 8:
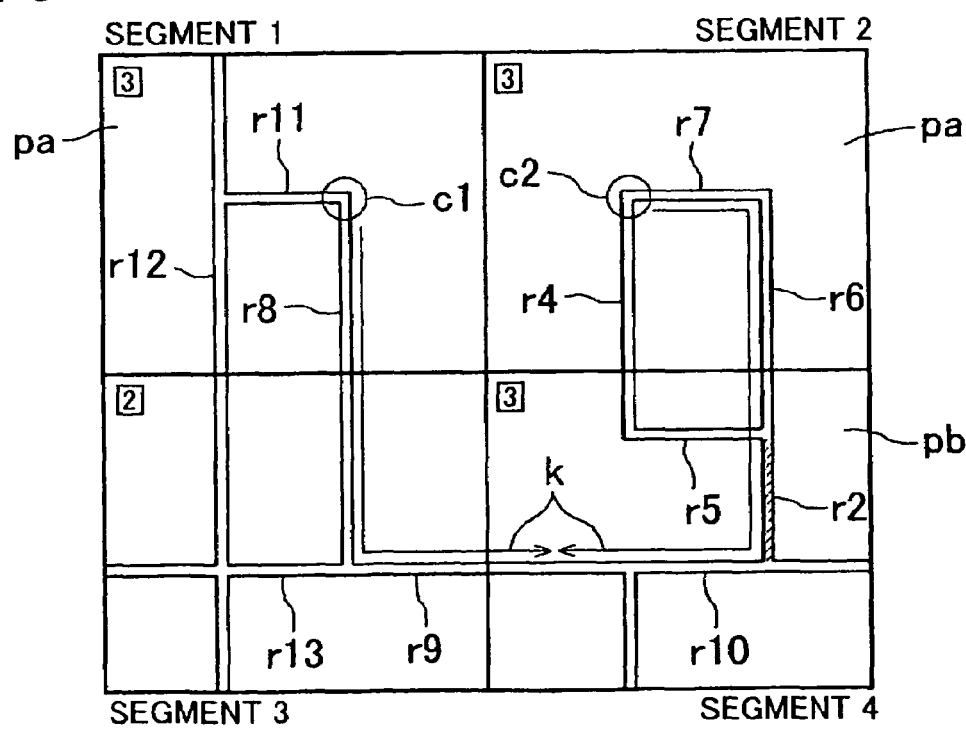
FIG. 8 is a drawing that shows the state of the road network in the map data having a state that corresponds to the state after the updating of the update target segments and the candidate segments in the navigation map data.

At this time, as shown, for example, in FIG. 8, the extraction means 9 carries out a search for the connecting route k that connects one end of the deleted road and the other end thereof in the road network Rn in the map data in a state that corresponds to the state after the update target segments pa of the navigation map data Mb and at least one segment p that includes the added road have been updated based on the newest version of the update map data Ma. Here, FIG. 8 shows the road network Rn that is altered from a state in which the segments 1 and 2 serving as the update target segments pa have been updated to version 3 as shown in FIG. 7, to a state in which the segment 4, which includes an added road r2, is also updated to version 3. In addition, in the case where a connecting route k that passes along the added road exist, the extraction means 9 extracts a segment p (the segment 4 in the example in FIG. 8) that includes the added road (the road r2 in the example in FIG. 8) that forms part of the connecting route k as the update required segment pb. Note that the extraction processing method for the update required segment pb by using this extraction means 9 will be explained in detail below with reference to the flowchart shown in FIG. 12.

The update data file generating means 10 is means for generating the update data file fa for the update target segments pa and the update required segments pb, which have been extracted by the extraction means 9, based on the update map data Ma that has been stored in the update map database DB1. At this time, the update data file generating means 10 generates update data files fa for the newest update version (version 3 in this example) for all of the segments p that correspond to the update target segments pa and the update required segments pb. In this example, each of the update data files fa is generated as a data file that includes, for example, information for specifying the segment p (all of the segments p that correspond to the update target segments pa and the update required segments pb) in the newest version of the map data for the update target segments pa and the update required segments pb and in the map data that is included in this update data file fa, and segment ID information that is used in common with, for example, the navigation map data Mb for the navigation apparatus 2.

The communication control means 11 is means for carrying out operation control of the communication apparatus 6. Specifically, the communication control means 11 controls the communication between the map update data supply apparatus 1 and the navigation apparatus 2 performed by the communication apparatus 6, and effects the operations for the reception of the update request data file fb that has been transmitted from the navigation apparatus 2 and the transmission of the update data file fa to the navigation apparatus 2 and the like in the communication apparatus 6. Thus, in this embodiment, this communication control means 11 and the communication apparatus 6 structure the "update data file supply means" that supplies the update data files fa to the navigation apparatus 2.

2. Navigation Apparatus 2

As shown in FIG. 2, the navigation apparatus 2 is provided with a navigation map database DB2, a control apparatus 21, a current position detecting apparatus 22, a display apparatus 23, a voice output apparatus 24, an input apparatus 25, and a communication apparatus 26. In addition, the control apparatus 21 is provided with navigation computing means 27, update request generating means 28, map data updating means 29, and communication control means 30. Here, the navigation computing means 27 is computing means for realizing the basic navigation functions as the navigation apparatus 2. Examples of the navigation functions of this navigation apparatus 2 include map display of the vicinity of the current position or a designated position, the search for routes from the departure point to the destination point, the route guidance to the destination point, map matching for correcting the current position on the road, the search for destination points, and the like. The control apparatus 21 of this navigation apparatus 2 is structured so as to be provided with an arithmetic processing apparatus such as a CPU and a recording medium such as a RAM or a ROM for storing software (programs), data and the like. In addition, each of the means 27 to 30 provided in the control apparatus 21 is structured such that the arithmetic processing apparatus of the control apparatus 21 serves as the central member, and a functional unit for carrying out various processing on input data is provided by hardware, software, or both of them. In addition, the navigation map database DB2 is stored, for example, in a recording medium that can be overwritten, such as a hard disk drive, flash memory or the like. Below, the structure of each of the units of the navigation apparatus 2 will be explained sequentially.

2-1. Navigation Map Database DB2

Figure 9:
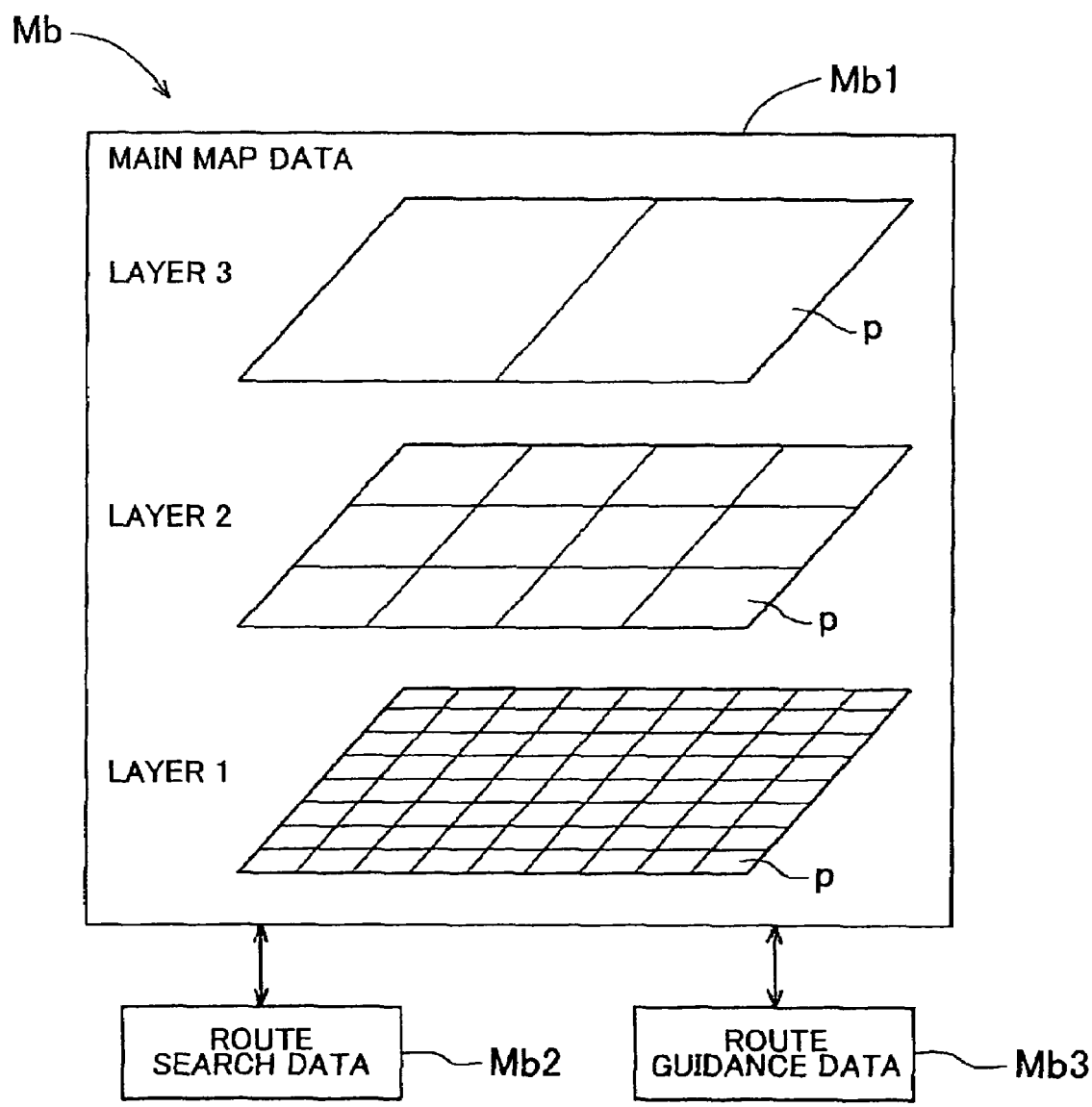
FIG. 9 is an explanatory drawing for explaining the structure of the navigation map data.

The navigation map data Mb is stored in the navigation map database DB2, and this navigation map data Mb is map data that is referred to by the navigation computing means 27 in order to realize navigation functions of the navigation apparatus 2. FIG. 9 is an explanatory drawing for explaining the structure of the navigation map data Mb that is stored in the navigation map database DB2. As shown in FIG. 9, the navigation map data Mb is provided with a main map data Mb1, a route search data Mb2, and a route guidance data Mb3. Here, the main map data Mb1 is divided into a plurality of layers according to the degree of the detail of the information for the features, such as the roads, stored in the navigation map database DB2. In this example, the main map data Mb1 includes three layers: layer 1, layer 2, and layer 3 (in the order from the lower level to the upper level). Here, as the layer becomes lower level, it has more detailed information for the features such as roads. Further, each layer of the main map data Mb1 is partitioned into a plurality of segments p. Here, the segments p are set so as to correspond to wider areas as the layers become higher level. Therefore, an area that corresponds to a plurality of segments p in a lower layer is included in one segment p in a higher layer. Each of the layers of the main map data Mb1 includes information for the road network Rn that represents the connection relationships between roads by using, for example, links, which correspond to roads, and nodes, which correspond to intersections. This main map data Mb1 is referred to by the navigation computing means 27, for example, when displaying a map of the vicinity of the current position or a designated position, or during map matching for correcting the current position on the road.

The route search data Mb2 is associated with the main map data Mb1, and is structured so as to have information about the cost of each link that structures the road network Rn, the travel conditions, the correspondence relationships of the nodes with those of the upper layers, and the like. This route search data Mb2 is referred to by the navigation computing means 27 during a route search from the departure point to the destination point. The route guidance data Mb3 is associated with the main map data Mb1, and is structured so as to provide information for images, voice, and the like that is necessary while providing route guidance to the destination point. Therefore, this route guidance data Mb3 is referred to by the navigation computing means 27 while providing the route guidance to the destination point.

As explained above, in the main map data Mb1 of the navigation map data Mb, the size of the area of the real world that corresponds to one segment p differs depending on the layer. In this example, the size of an area that is included in each of the segments p of the lowest layer 1 of the main map data Mb1 corresponds to the size of the area of each of the segments p of the update map data Ma. Therefore, the update data file fa that is supplied from the map update data supply apparatus 1 is a data file for a segment unit that corresponds to the segment p of layer 1 of the main map data Mb1. In addition, layer 2 and layer 3 of the main map data Mb1, and the route search data Mb2 and the route guidance data Mb3, are generated and updated by the map data updating means based on the data of layer 1 of the main map data Mb1 after it has been updated by this update data file fa.

2-2. Current Position Detecting Apparatus 22

The current position detecting apparatus 22 is an apparatus for detecting the current position of the navigation apparatus 2. Accordingly, the current position detecting apparatus 22 is structured so as to include, for example, a GPS receiver, a direction sensor, a distance sensor and the like (not illustrated). Based on the information acquired thereby, the current position detecting apparatus 22 acquires information about the coordinates, which show the current position, the forward direction and the like, and outputs the information to the control apparatus 21. In the control apparatus 21, the navigation computation means 27 carries out processing for the display of the current position, map matching and the like, based on the current position information detected by this current position detecting apparatus 22, and the navigation map data Mb.

2-3. Display Apparatus 23, Voice Output Apparatus 24, Input Apparatus 25, and Communication Apparatus 26

The display apparatus 23 is structured so as to include a liquid crystal display and the like. The voice output apparatus 24 is structured so as to include a speaker and an amplifier and the like. The display apparatus 23 and the voice output apparatus 24 are operated under the control of the navigation computation means 27, and carry out the display and voice output for the current position display, the route search between two points, forward travel guidance, and the destination point search and the like. The input apparatus 25 is structured by being provided with a touch panel that is disposed integrally with the display apparatus 23, operating switches, a remote controller and the like. This input apparatus 25 receives the operational input by the user and outputs the content thereof to the control apparatus 21. The communication apparatus 6 is structured so as to enable the carrying out of the transmission and reception of data by communicating with the communication apparatus 6 of the map update data supply apparatus 1 via various types of well-known fixed-line and wireless communication networks.

2-4. Control Apparatus 21

As explained above, the control apparatus 21 is provided with the navigation computation means 27, the update request generating means 28, the map data updating means 29, and the communication control means 30. The navigation computation means 27, as explained above, is computation means for realizing the basic navigation functions of the navigation apparatus 2, such as, for example, the map display of the vicinity of the current position or a designated position, route searches from the departure point to the destination point, route guidance to the destination point, map matching for correcting the current position on the road, the search for destination points, and the like. In this example, although omitted from the drawings, the navigation computation means 27 includes five application programs that serve as navigation operation programs: a display program, a map matching program, a route search program, a route guidance program, a retrieval program. Here, the display program is a program for carrying out the map display of the vicinity of the current position and the destination point and the like, and the current position display to the map, on the display screen of the display apparatus 23. The map matching program is a program for carrying out the map matching processing that aligns the current position, which has been detected by the current position detecting apparatus 22, on the roads of the map. The route search program is a program for carrying out the route searches, which, for example, search for a guided route from the departure point such as the current position to the destination point that has been input by using the input apparatus 25. The route guidance program is a program for carrying out the processing that gives the user instructions, according to the route to the destination point that has been determined by the route search program, so as to provide guidance along a suitable route by guidance display by using the display screen of the display apparatus 23 and voice guidance by using the voice output apparatus 24. The retrieval program is a program for searching for locations for the destination point and map display based on an address, telephone number, facility name, category, or the like. The operation processing of the navigation apparatus 2 performed by each of the other application programs is well known, and thus the detailed explanation thereof will be omitted. Note that, each of these application programs refers to and uses the navigation map data Mb.

The update request generating means 28 is means for generating an update request data file fb for an update target segment pa. Here, the update request generating means 28 determines the update target segments pa, and generates update request data files fb for requesting update data files fa for the update target segments pa from the map update data supply apparatus 1. In this example, an update target segment pa is a segment p of the navigation map data Mb that must be referred to by the navigation computation means 27 of the navigation apparatus 2, and one or more segments p are selected from among the segments p of layer 1 of the main map data Mb1. Here, the segments p that are actually necessary or segments that have a high probability of becoming necessary in the future are included as segments p that must be referred to by the navigation computation means 27. Therefore, for example, the segments p that include the vicinity of a position that has been registered as a user's house, the vicinity of the user's current position, which has been detected by the current position detecting means 22, the vicinity of the destination point, the vicinity of the route to a set destination point and the like are appropriate as an update target segment pa. Further, it is advantageous to use a structure in which, when determining such update target segments pa, for example, the area to be updated is widened and many segments p are selected for the vicinity of the position of the user's house, and the area to be updated is narrowed and the necessary minimum number of segments p are selected for the vicinity of a route to a destination point. Furthermore, in the case where a request for map update processing, in which an area has been designated by the user of the navigation apparatus 2, is received, the segments p included in the area that has been designated at this time are used as the update target segments pa. The update request data files fb are generated as data files that include, for example, information for specifying one or more update target segments pa that have been determined, and information for specifying the update state of each of the segments p of the navigation map data Mb for the update target segments pa and at least segments p within a predetermined range of the vicinity of the update target segments pa. Here, for example, the segment ID information that is shared with the update map data Ma of the map update data supply apparatus 1 can be used as information for specifying the update target segments pa. In addition, for example, the update version information of each of the segments p can be used as the update state information for specifying the update state of each of the segments p. In this example, as explained above, the information that shows that the update version of the segments 1 to 4 is version 2 is transmitted to the map update data supply apparatus 1 so as to be included in the update request data file fb.

The map data updating means 29 is means for carrying out the updating of the navigation map data Mb based on the update data files fa that have been supplied from the map update data supply apparatus 1. As explained above, in this example, each of the update data files fa is a file that includes map data for the update target segments pa or the update required segments pb. Therefore, the map data updating means 29 carries out the updating of the navigation map data Mb by updating the map data of the segments p that correspond to the update target segments pa and the update required segments pb in layer 1 of the main map data Mb1 of the navigation map data Mb to map data for the update target segments pa and the update required segments pb that are included in the update data files fa.

The communication control means 30 is means for carrying out the operation control of the communication apparatus 26. Specifically, the communication control means 30 controls the communication between the map update data supply apparatus 1 and the navigation apparatus 2 performed by the communication apparatus 26, and effects the operations, for example, for the transmission of the update required data files fb to the map update data supply apparatus 1 and the reception of the update data files fa that has been transmitted from the map update data supply apparatus 1 in the communication apparatus 26. Therefore, in this embodiment, the communication control means 30 and the communication apparatus 26 structure "update data file acquiring means" for acquiring the update data files supplied from the map update data supply apparatus.

3. Operation Processing of Map Update Data Supply Apparatus 1

Figure 10:
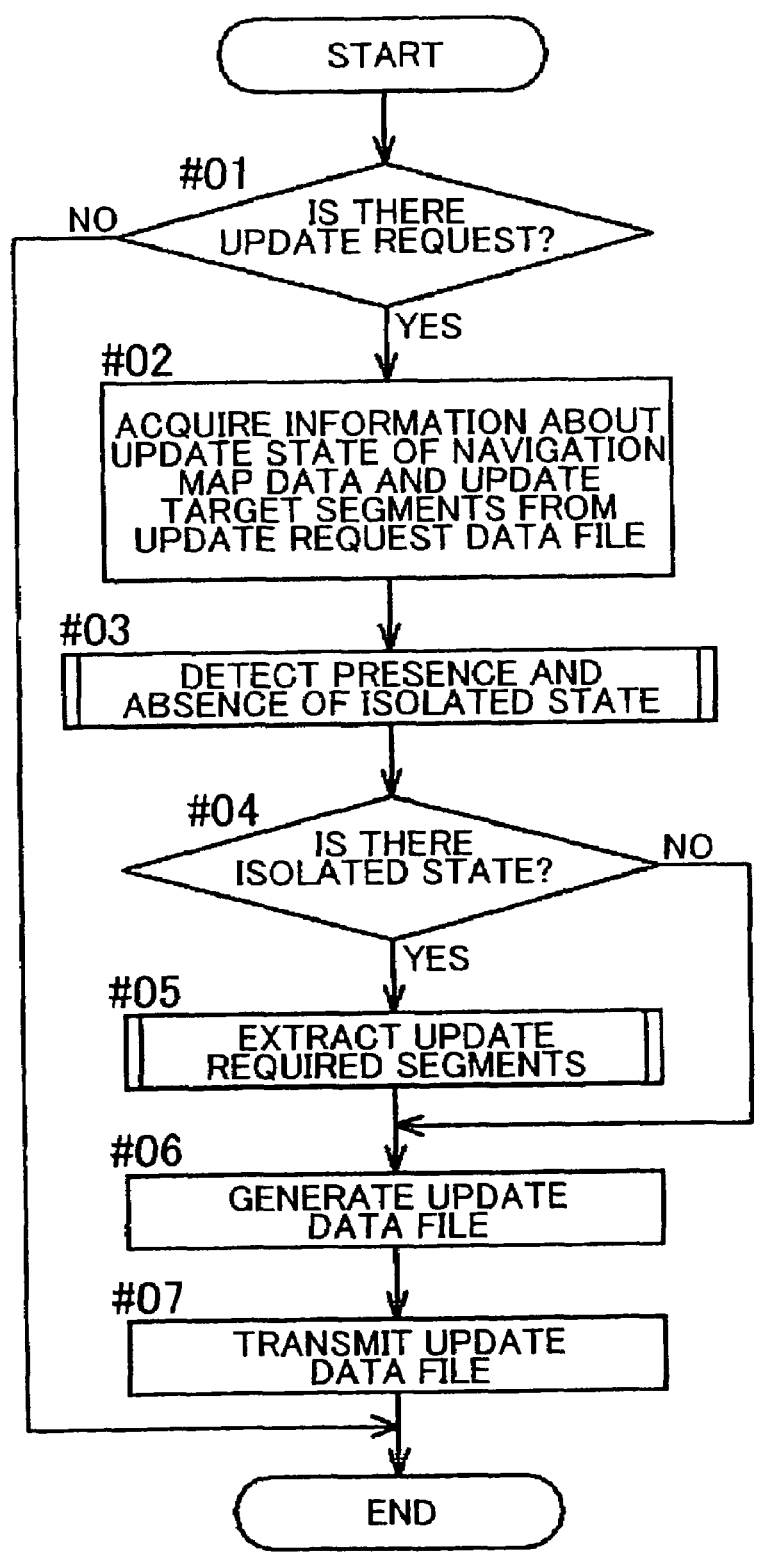
FIG. 10 is a flowchart that shows the overall processing of a map update data supply method using the map update data supply apparatus according to the embodiment of the present invention.
Figure 11:
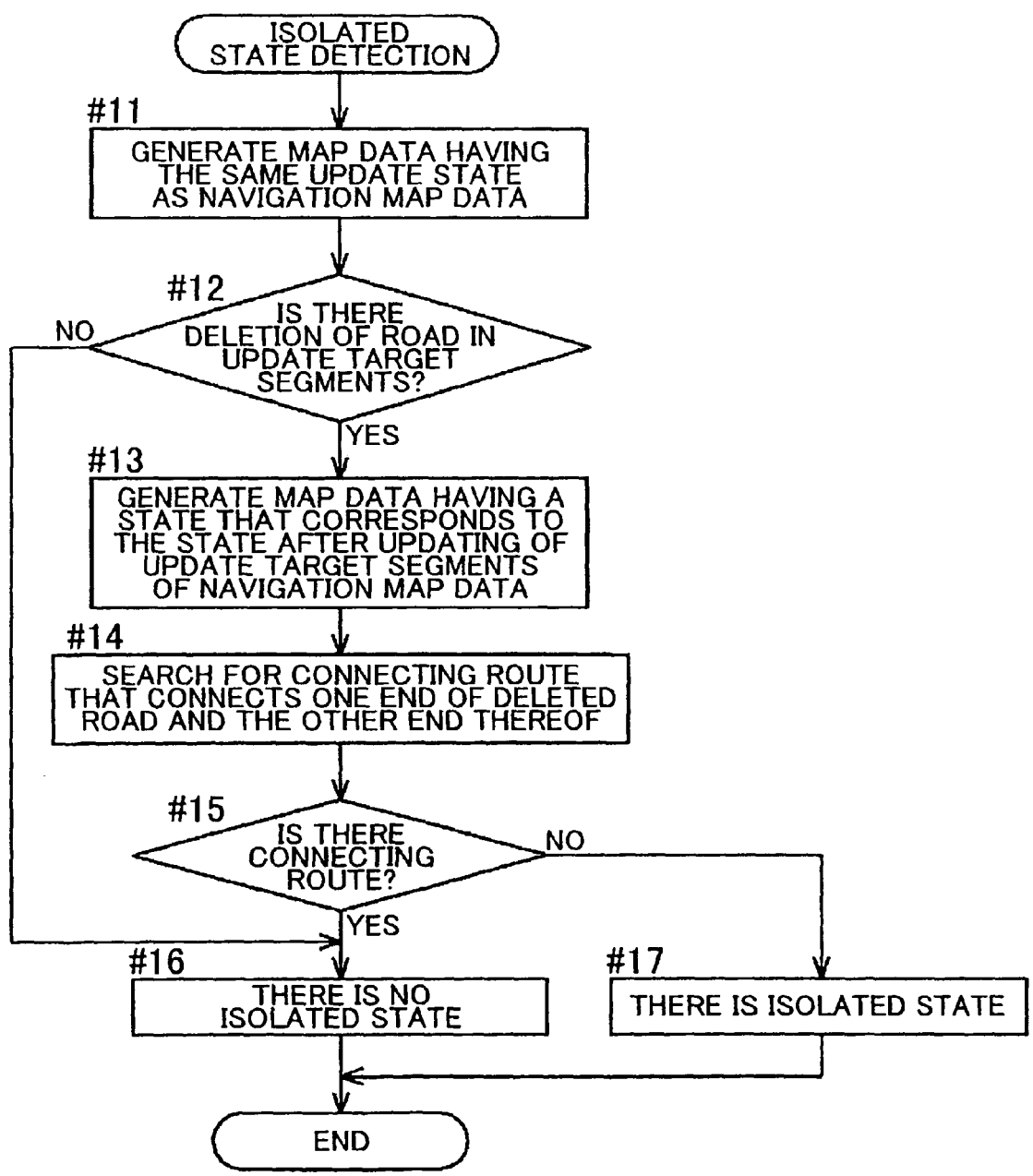
FIG. 11 is a flowchart that shows a processing method for detecting an isolated state using isolation detection means.
Figure 12:
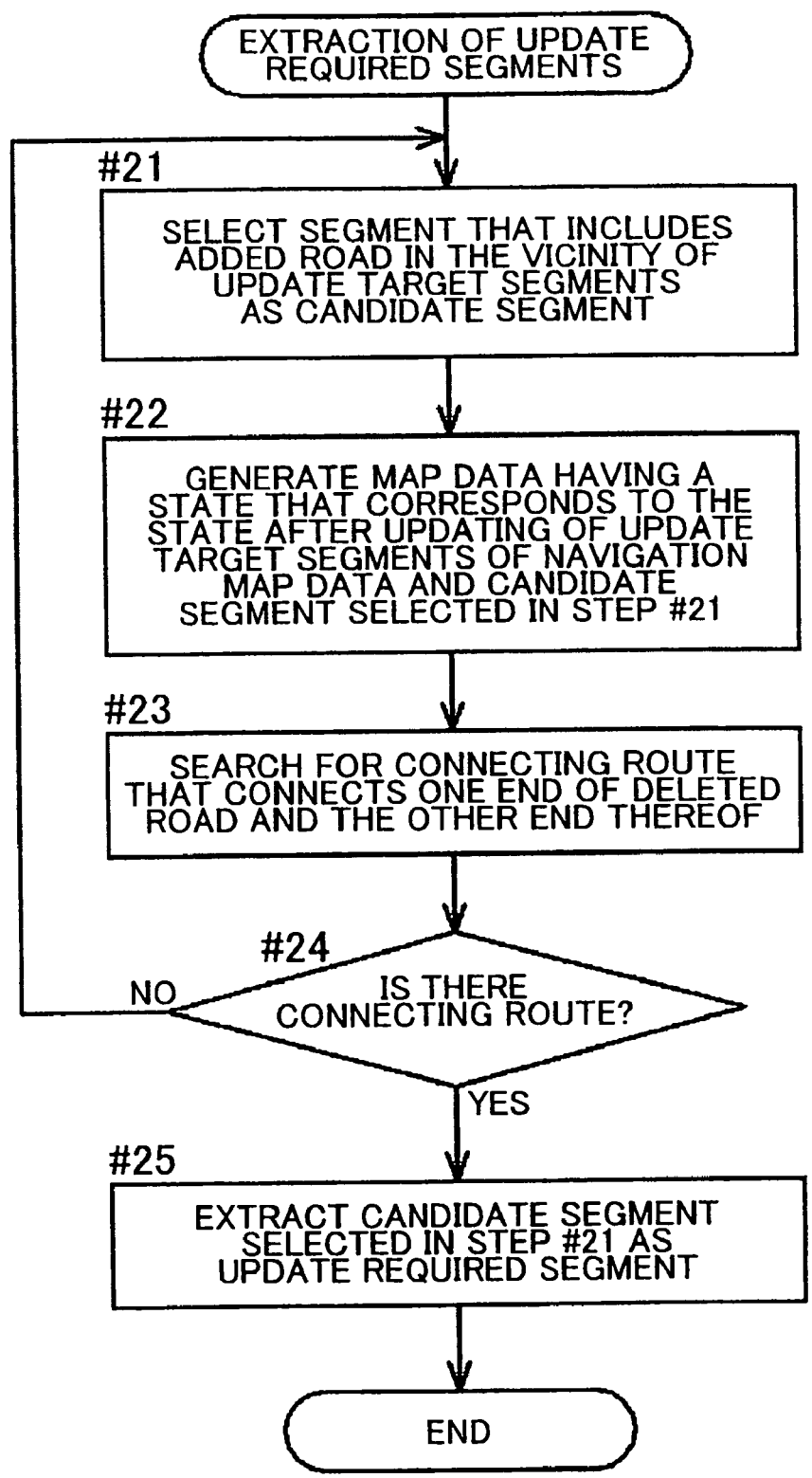
FIG. 12 is a flowchart that shows a processing method for extracting update required segments using extraction means.

Next, the operation processing of the map update data supply apparatus 1 will be explained in detail with reference to the flowcharts shown in FIGS. 10 to 12. Further, the detection processing for the isolated state by the isolation detection means 8 and the extraction processing of the update required segments pb by the extraction means 9 will be concretely explained by using the example of the road network Rn shown in FIGS. 5 to 8. FIGS. 5 to 8 show each state of the road network Rn of the map data for the segments 1 to 4 based on a plurality of update versions of the update map data Ma that is stored in the update map database DB1. In these figures, the numerals enclosed in the squares show the update version for each of the segments p. In addition, in these figures, r1 to r5 are reference numerals that distinguish the respective roads, and the roads r1 to r15 are separated by intersections respectively. Note that, in these FIGS. 5 to 8, only a portion of the segments p (segments 1 to 4) is shown in order to simplify the explanation. However, actually, many more segments p are treated as processing targets in many cases.

3-1. Overall Processing of Map Update Data Supply Method

This map update data supply apparatus 1 carries out processing such that it generates update data files fa for the update target segments pa based on the update request from the navigation apparatus 2, and for the update required segments pb as necessary, and transmits the update data files fa. FIG. 10 is a flowchart that shows the overall processing of the map update data supply method that is performed by the map update data supply apparatus 1. As shown in FIG. 10, when there is an update request from the navigation apparatus 2 to the map update data supply apparatus 1, that is, when the map update data supply apparatus 1 has received update request data files fb (step #01: Yes), the control apparatus 3 acquires information about the update state of the navigation map data Mb and the update target segments pa from the update request data file fb (step #02).

Next, the control apparatus 3 detects the presence and absence of the isolated state that occurs due to updating the update target segments pa of the navigation map data Mb, which has been obtained in step #02, based on the update map data Ma (step #03) by using the isolation detection means 8. The isolated state detection processing by this isolation detection means 8 will be explained in detail later with reference to the flowchart in FIG. 11. In the case where the presence of an isolated state has been detected (step #04: Yes), the control unit 3 extracts the update required segments pb in order to prevent the isolated state by using the extraction means 9 (step #05). In contrast, in the case where the presence of the isolated state has not been detected (step #04: No), the processing in step #05 is not carried out.

Subsequently, the control apparatus 3 generates the update data files fa by using the update data file generating means 10 (step #06). At this time, if an update required segment pb is not extracted in step #05 because no isolated state is detected in step #04 (step #04: No), the update data file generating means 10 generates update data files fa only for the update target segments pa acquired in step #02. If an update required segment pb is extracted in step #05, the update data file generating means 10 generates update data files fa for the update target segments pa acquired in step #02 and for the update required segment pb extracted in step #05. Further, the control apparatus 3 transmits the update data files fa generated in step #06 to the navigation apparatus 2 by controlling the communication apparatus 6 by using the communication control means 11 (step #07). Due to the processing described above, the update data files fa are supplied to the navigation apparatus 2 (the target map data side).

3-2. Detection Processing Method for Isolated State

Next, the detection processing method for an isolated state by the isolation detection means 8 in step #03 will be explained. FIG. 11 is a flowchart that shows the detection processing method for the isolated state by using this isolation detection means 8. As shown in FIG. 11, the isolation detection means 8 first generates map data for the same update state as the navigation map data Mb based on the update state of the navigation map data Mb that has been acquired in step #02 (step #11). Specifically, the isolation detection means 8 reads the update map data Ma having the same update version as the navigation map data Mb from the update map database DB1 based on information, which is included in the update request data file fb, about the update state of each of the segments p of the navigation map data Mb for the update target segments pa and at least the segments p within a predetermined range in the vicinity of the update target segments pa, and generates map data having the same update state as the navigation map data Mb before updating by the update data file fa. In this example, in step #02, information indicating that segments 1 and 2, which are assigned as update target segments pa, and segments 1 to 4, which are assigned as the update state of the navigation map data Mb, are all version 2 is acquired from the update request data files fb. FIG. 5 shows the same update state as the navigation map data Mb that has been generated based on this information, namely, the state of the road network Rn in the map data in which all of the segments 1 to 4 are version 2. FIG. 6 shows the newest version of the update map data Ma in this example, namely, the state of the road network Rn in the map data in which all of the segments 1 to 4 are version 3.

Next, about the update target segments pa acquired in step #02, the isolation detection means 8 determines whether or not there is a deletion of a road in the updated content of the newest version of the update map data Ma, with respect to the navigation map data Mb (step #12). The determination is carried out by comparing, about the update target segments pa, the map data (FIG. 5) having the same update state as the navigation map data Mb generated in step #11 and the newest version of the update map data Ma (FIG. 6). In other words, about the target segments pa, the isolation detection means 8 extracts the updated content (changed points) of the road network Rn of the newest version of the update map data Ma (FIG. 6), with respect to the road network Rn of the map data (FIG. 5) having the same update state as the navigation map data Mb, and determines whether or not there has been a deletion of a road in the updated content. In this example, with respect to the road network Rn of the map data having the same update state as the navigation map data Mb shown in FIG. 5, the road r1 that extends between segment 1 and segment 2 is deleted, and the road r2 and the road r3 are respectively added to segment 4 and segment 3 in the road network Rn of the newest version of the update map data Ma shown in FIG. 6. Further, in the version 3 of the road network Rn, due to the addition of the road r3, the road r8 has been divided into roads r8 and r14, and road r12 has been divided into roads r12 and r15. As described above, in this example, the update target segments pa are segments 1 and 2, and the road r1 has been deleted in these segments 1 and 2. Therefore, in this example, the isolation detection means 8 determines that there is a deletion of a road in the update target segments pa (step #12: Yes).

In this manner, when it is determined that there is a deletion of a road in the update target segments pa (step #12: Yes), the isolation detection means 8 next generates map data having a state that corresponds to the state after the update target segments pa of the navigation map data Mb have been updated by the newest version of the update map data Ma (step #13). Specifically, the isolation detection means 8 generates map data having a state that corresponds to the state after the updating of the update target segments pa of the navigation map data Mb by replacing the update target segments pa in the map data (FIG. 5) having the same update state as the navigation map data Mb generated in step #11 with the corresponding segments in the newest version of the update map data Ma (FIG. 6). In this example, the update target segments pa are segments 1 and 2, and thus the segments 1 and 2 in the map data shown in FIG. 5 are replaced with segments 1 and 2 in the newest version of the update map data Ma shown in FIG. 6. FIG. 7 shows the state of the road network Rn in the map data having a state that corresponds to the state after the updating of the update target segments pa of this navigation map data Mb.

Next, the isolation detection means 8 carries out processing in which connecting route k that connects one end of the deleted road in the update target segments pa and the other end thereof is retrieved in the map data that is generated in step #13 and that has a state corresponding to the state after the update target segments pa of the navigation map data Mb have been updated by the newest version of the update map data Ma (step #14). Due to this processing, in step #12, the isolation detection means 8 detects the presence and the absence of the isolated state related to the road that was connected to the deleted road in the case where it has been determined that there is a deletion of a road in the updated content in the newest version of the update map data Ma for the update target segments pa in the navigation map data Mb. In this example, the isolation detection means 8 carries out the search for the connecting route k that connects the intersection c1 of one end of the deleted road r1 (refer to FIGS. 5 and 6) and the intersection c2 at the other end thereof within the segments 1 and 2 that are the update target segments pa, in the road network Rn in the map data having a state that corresponds to the state after the updating of the update target segments pa in the navigation map data Mb shown in FIG. 7. Here, the isolation detection means 8 carries out the search for the connecting route k (refer to FIG. 8) that is directed from the intersection c1 at one end, and also directed from the intersection c2 at the other end to connect the intersections, as shown by the thin line arrows in FIG. 7.

Subsequently, as a result of the search in step #14, the isolation detection means 8 determines whether or not there is the connecting route k (step #15). Then, for example, as shown in FIG. 8, in the case where there is the connecting route k (step #15: Yes), the isolation detection means 8 detects that there is no isolated state in which some of the roads have become isolated from other roads, and the detected results are output (step #16). Then, in the case where it has been determined in step #12 that there has been no deleting of roads in the update target segments pa (step #12: No), the isolation detection means 8 detects that there is no isolated state in the road network Rn (step #16). In contrast, in the case where, as a result of the search in step #14, there is no connecting route k (step #15: No), the isolation detection means 8 detects that there is the isolated state, and the detected results are output (step #17). In the example shown in FIG. 7, because the roads r4 to r7 form a closed circuit r4-7, the connecting route k that connects the intersection c1 at one end and the intersection c2 at the other end is not present (step #15: No). Thus, in this example, the isolation detection means 8 detects that there is the isolated state in the road network Rn of the map data having a state that corresponds to the state after the updating of the segments 1 and 2, which are the update target segments pa of the navigation map data Mb.

3-3. Extraction Processing Method for Update Required Segment pb

Next, the extraction processing method of the update required segment pb, which is carried out in step #05 by the extraction means 9 will be explained. FIG. 12 is a flowchart that shows the extraction processing method for the update required segment pb that is carried out by the extraction means 9. As shown in FIG. 12, first the extraction means 9 selects a segment p that includes the road that has been added in the vicinity of the update target segments pa, as a candidate segment for the update required segment pb (step #21). In this embodiment, the extraction means 9 selects one segment p as the candidate segment. Preferably, this candidate segment is selected from among the segments that are adjacent to the update target segments pa. Specifically, in this example, the road network Rn of the newest version of the update map data Ma that is shown in FIG. 6 is produced by adding the road r2 to segment 4 and by adding the road r3 to segment 3 in the road network Rn of the map data having the same update state as the navigation map data Mb shown in FIG. 5. Thus, the extraction means 9 selects one candidate segment from among the segments 3 and 4 that include the added roads r2 and r3. In the following description, first, an example of the case in which the segment 4 is selected as the candidate segment will be explained.

After selecting the candidate segment (step #21), the extraction means 9 generates the map data having a state that corresponds to the state after the update target segments pa of the navigation map data Mb and the candidate segment selected in step #21 have been updated by the newest version of the update map data Ma (step #22). Specifically, the extraction means 9 generates map data having a state that corresponds to the state after the update target segments pa of the navigation map data Mb and the candidate segment are updated, by replacing the update target segments pa and the candidate segment selected in step #21 in the map data (FIG. 5) having the same update state as the navigation map data Mb generated in step #11 shown in FIG. 11, with the corresponding segments in the newest version of the update map data Ma (FIG. 6). In this example, as explained above, the update target segments pa are segments 1 and 2 and the candidate segment is segment 4, and thus the segments 1, 2, and 4 in the map data shown in FIG. 5 are replaced with segments 1, 2, and 4 in the newest version of the update map data Ma shown in FIG. 6. FIG. 8 shows the state of the road network Rn in the map data having a state that corresponds to the state after the updating of the update target segments pa of this navigation map data Mb and the candidate segment.

Next, the extraction means 9 carries out processing in which the connecting route k, which join one end of the deleted road and the other end thereof, in the update target segments pa are retrieved similarly to when an isolated state is detected by the isolation detection means 8 in the map data having a state that corresponds to the state after the update target segments pa in the navigation map data Mb and the candidate segment have been updated by using the newest version of the update map data Ma, which was generated in step #22 (step #23). Specifically, in this example, the extraction means 9 searches for the connecting route k that connects the intersection c1 at one end of the deleted road r1 (refer to FIG. 5 and FIG. 6) and the intersection c2 at the other end thereof, in the road network Rn of the map data having a state that corresponds to the state after the updating of the update target segments pa in the navigation map data Mb shown in FIG. 8 and the candidate segment. Here, as shown by the thin line arrows in FIG. 8, the extraction means 9 searches for the connecting route k that are directed towards each other from the intersection c1 at one end and the intersection c2 at the other end.

Subsequently, as a result of the searching in step #23, the extraction means 9 determines whether or not there is the connecting route k (step #24). In the case where there is the connecting route k (step #24: Yes), the extraction means 9 extracts the candidate segment that has been selected in step #21 when the connecting route k is present, as the update required segment pb (step #25). In this example, as shown in FIG. 8, the connecting route k is present that extends from the intersection c1 at the one end to reach the intersection c2 at the other end via the roads r8, r9, r10, r2, r6, and r7. Therefore, the extraction means 9 extracts the segment 4, which includes the added road r2, as the update required segment pb.

In contrast, in the case where, as a result of the search in step #23, there is no connecting route k (step #24: No), the candidate segment is not assigned as the update required segment pb. Then, the processing returns to step #21, and the extraction means 9 selects another candidate segment and carries out processing that is similar to that described above. For example, although not illustrated, in the case where the segment 3 that includes an added road r3 is selected as the candidate segment for the update required segment pb (step #21), the extraction means 9 generates map data in which the segments 1, 2, and 3 of the map data that is shown in FIG. 5 are overwritten by the segments 1, 2, and 3 of the newest version of the map data that is shown in FIG. 6 as map data having a state that corresponds to the state after the update target segments pa of the navigation map data Mb and the candidate segment selected in step #21 have been updated by the newest version of the update map data Ma. In this case, the connecting route k that connects the intersection c1 at one end of the deleted road r1 and the intersection c2 at the other end thereof is not present (step #24: No). Thus, the extraction means 9 does not assign segment 3, which is the candidate segment in this case, as the update required segment pb. Note that the extraction means 9 carries out similar processing, in which segments p that include the added road are sequentially assigned as the candidate segment, until at least one update required segment pb has been extracted.

4. Operation Processing Method for Map Updating in Navigation Apparatus 2

Figure 13:
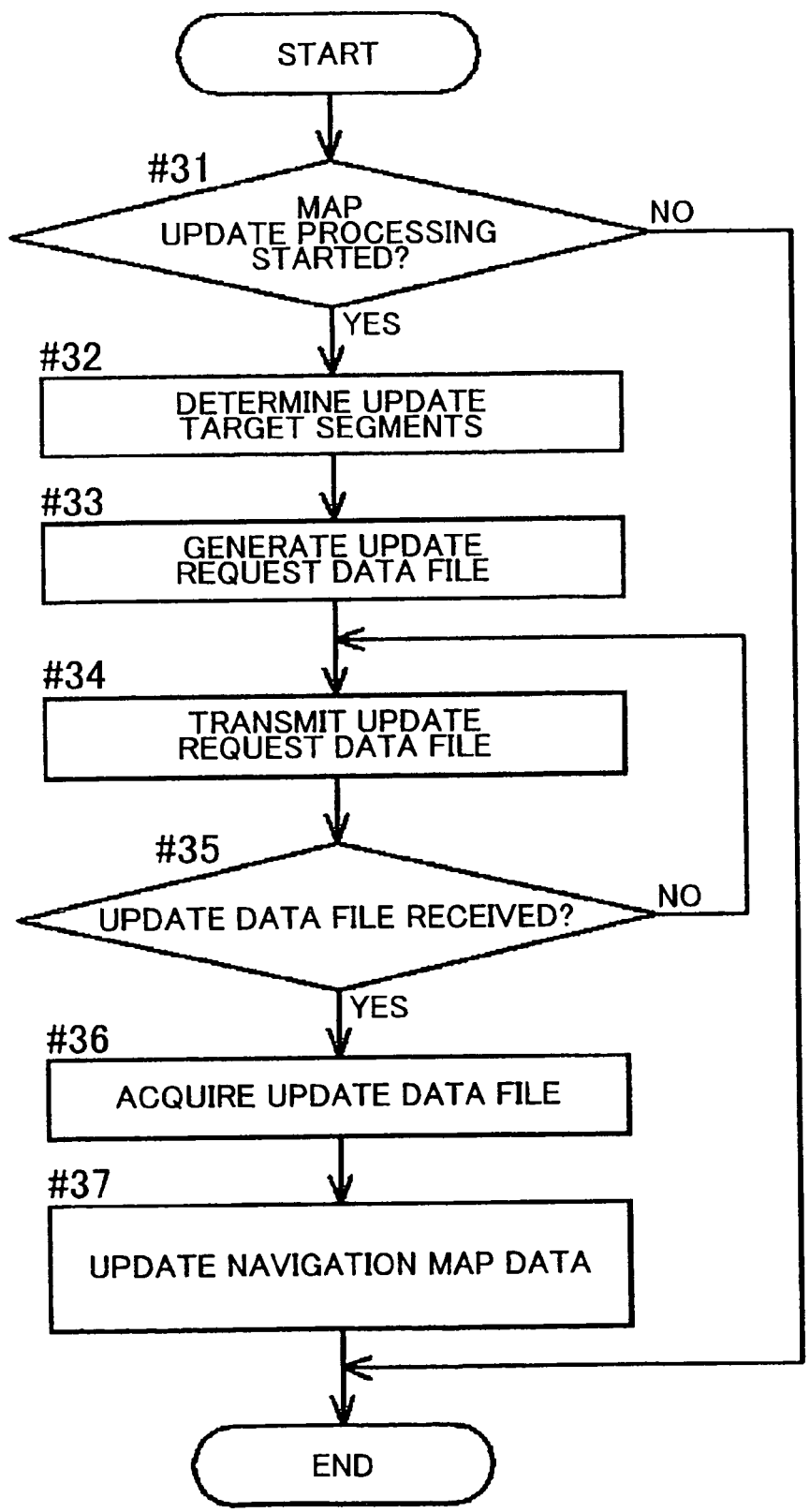
FIG. 13 is a flowchart that shows an operation processing method for the map updating in the navigation apparatus.

Next, the operation processing method for the map updating in the navigation apparatus 2 will be explained in detail with reference to the flowchart that is shown in FIG. 13. As shown in FIG. 13, during the updating of the navigation map data Mb, the navigation apparatus 2 generates an update request data file fb by using the update request generating means 28 and transmits this update request data file fb to the map update data supply apparatus 1. Then, the navigation apparatus acquires the update data file fa generated by the map update data supply apparatus 1 that has received the update required data file fb, and updates the navigation map data Mb based on the update data file fa.

Specifically, as shown in FIG. 13, the navigation apparatus 2 first determines whether or not the map update processing has been started (step #31). This map update processing is started, for example, in the case where the navigation apparatus 2 periodically carries out the map update processing at predetermined intervals, if the navigation computation means 27 has referred to the navigation map data Mb under conditions that satisfy predetermined conditions; or if there has been a starting request operation for map update processing by the user of the navigation apparatus 2.

In the case where the map updating processing has started (step #31: Yes), the navigation apparatus 2 determines the update target segments pa by using the update request generating means 28 (step #32). Here, as explained above, the update target segments pa include segments p that are actually necessary and segments that have a high probably of becoming necessary in the future for the processing by the navigation computation means 27. In this example, one or more update target segments pa are selected from among the segments p in layer 1 of the main map data Mb1.

Next, the navigation apparatus 2 generates an update request data file fb by using the update request generating means 28 (step #33). Here, as explained above, the update request data file fb is generated as a data file that includes, for example, information for specifying the one or more update target segments pa that have been determined and information for specifying the update target segments pa and the update state of each of the segments p of the navigation map data Mb at least for the segments p within a predetermined range of the vicinity of the update target segments pa. In addition, the navigation apparatus 2 transmits the update request data file fb that has been generated in step #33 to the map update data supply apparatus 1 (step #34) by controlling the communication apparatus 26 by using the communication control device 30. In the map update data supply apparatus 1 that has received this update request data file fb, as explained above, processing is carried out in which the update data file fa is generated and transmitted to the navigation apparatus 2. In the case where the update data file fa from the map update data supply apparatus 1 cannot be received even after a predetermined time period (step #35: No), the navigation apparatus 2 determines that there has been a communication failure and transmits the update request data file fb (step #34) again.

In addition, in the case where the navigation apparatus 2 receives the update data file fa from the map update data supply apparatus 1 (step #35: Yes), the navigation apparatus 2 acquires the update data file fa (step #36), and carries out updating of the navigation map data Mb based on the update data file fa by using the map data updating means 29 (step #37). In this example, as explained above, each update data file fa is a file that includes the newest version of the map data for the update required segments pb in the case where the update target segments pa and the update required segments pb, which is extracted by the extraction means 9, are extracted. Therefore, the map data updating means 29 carries out updating of the navigation map data Mb in step #37 by changing the map data of the update target segments pa and the segments p that correspond to the update required segments pb, in layer 1 of the main map data Mb1 of the navigation map data Mb, to the map data of the update target segments pa and the update required segments pb that are included in the update data file fa. Thus, the operation processing for the map updating in the navigation apparatus 2 is completed.

OTHER EMBODIMENTS (1) In the embodiment explained above, the case has been explained for a structure in which the isolation detection means 8 searches for the connecting route k that connects one end of a deleted road and the other end thereof in a state that corresponds to the state after the update target segments pa of the navigation map data Mb have been updated based on the update map data Ma, and detects that there is the isolated state in the case where the connecting route k is not present. However, the structure of the isolation detection means 8 is not limited to this. More specifically, it is sufficient that if the isolation detection means 8 has a structure in which it is able to detect the presence and the absence of the isolated state where some of the roads have become isolated from other roads in the road network. For example, another advantageous embodiment of the present invention has a structure in which the road shape or the like is used to detect that some of the roads have isolated from other roads.

(2) In the embodiment explained above, the case has been explained for a structure in which, in a state that corresponds to the state after the update target segments pa of the navigation map data Mb and at least one segment p including an added road have been updated based on the newest version of the update map data Ma, the extraction means 9 carries out the search for the connecting route k that connects one end of the deleted road and the other end thereof, and in the case where there is the connecting route k, the segments p that include the added road that structures the connecting route k are extracted as the update required segments pb. However, the structure of the extraction means 9 is not limited to this. More specifically, it is sufficient if, in the case where it is detected that there is an isolated state, the extraction means 9 extracts, as the update required segments pb, the segments p of the update map data Ma, other than the update target segments pa, that include a road that connects to the isolated some of the road. For example, one advantageous embodiment of the present invention has a structure in which the extraction means 9 uses the road shape or the like to extract the segments p having a road that connects to the isolated some of the road.

(3) In the embodiment explained above, as an example, the case has been explained in which the extraction means 9 searches for the connecting route k in a state that corresponds to the state after the update target segments pa of the navigation map data Mb and the one segment p (in the above example, segment 4) that includes the added road have been updated based on the newest version of the update map data Ma. However, the applicable range of the present invention is not limited this. Another advantageous embodiment of the present invention has a structure in which the extraction means 9 searches for the connecting route k in a state that corresponds to the state after the update target segments pa (in the above example, segments 1 and 2) of the navigation map data Mb and a plurality of segments p (in the above example, segments 3 and 4) that include the added road have been updated based on the newest version of the update map data Ma.

(4) In the embodiment explained above, as an example, the case has been explained in which the update target segments pa are set to the segments p that are designated by the update request data files fb from the navigation apparatus 2. However, the determination method of the update target segments pa is not limited this. For example, it is possible to use a structure in which the map update data supply apparatus 1 makes this determination.

(5) In the embodiment explained above, as an example, the case has been explained in which, as shown in FIG. 3, the update map data Ma in the update map database DB1 stores the map data for all of the segments p that structure the update map data Ma for each of the versions. However, the structure of the update map data Ma is not limited to this. Specifically, for example, another advantageous embodiment of the present invention has a structure in which the segments p that have been updated have their version upgraded, and a new update version of data is not generated for the segments that have no changed content, whereby the newest update version differs for each of the segments p. If this structure is adopted, it is possible to reduce the total amount of data in the update map database DB1.

(6) In the embodiment explained above, as an example, the case has been explained in which the update data files fa are assigned as the files of map data for each of the segments p. However, the structure of the update data files fa is not limited to this. For example, another advantageous embodiment of the present invention has a structure in which these update data files fa are used as difference data for each of the segments p that represent the content that should be changed with respect to the content of the navigation map data Mb before updating. According to such a structure, compared to the case where all of the map data for each of the segments p is included in the update data files fa, the amount of data in the file can be made small.

(7) Further, in the embodiment explained above, as an example, the case has been explained in which the update data files fa are generated for each of the segments p of the update target segments pa or the update required segments pb. However, the structure of the update data files fa is not limited to this. Another advantageous embodiment of the present invention has a structure in which the update data for a plurality of segments p that are transmitted to one navigation apparatus 2 are combined into one file.

(8) In the embodiment explained above, as an example, the case has been explained in which the map update data supply apparatus 1 transmits the update data files fa to the navigation apparatus 2 via a communication network. However, the supply method for the update data files fa is not limited to this. For example, another advantageous embodiment of the present invention has a structure in which, rather than transmitting the update data files fa via the communication means, the update data files fa are recorded on a prescribed recording medium by using recording medium recording means, and supplied to the user of the navigation apparatus 2 by postal delivery or the like. In this case, it is possible to use a structure in which the map update data supply apparatus 1 acquires the update request from the navigation apparatus 2 by using another means such as postal delivery rather than communication that is similar to each of the embodiments that have been explained above.

(9) In the embodiment explained above, as an example, the case has been explained in which the update data files fa, which are supplied by the map update data supply apparatus 1, set the navigation map data Mb for the navigation apparatus 2 as the update target. However, the target map data that the update data files fa set as the update target is not limited to the navigation map data Mb, and provided that the target map data is a map data that has been partitioned into a plurality of segments, it is possible to use map data having a variety of uses as the update target. In addition, the target map data is not limited to data that is provided to an apparatus that is separated from the map update data supply apparatus 1, as in the embodiment explained above, and for example, it is possible to use a structure in which an apparatus that is integrally provided with the map update data supply apparatus 1 is provided with the target map data.

INDUSTRIAL APPLICABILITY

The present invention is applicable to a map update data supply apparatus that supplies an update data file for each segment of target map data that includes information for at least a road network and that is partitioned into a plurality of segments, a map data update system that uses this map update data supply apparatus, and a map update data supply method and the like.

The invention claimed is:

1. A map update data supply apparatus that supplies an update data file for each segment of target map data that includes information for at least a road network and that is partitioned into a plurality of segments, comprising:
    an update map database that stores update map data that is partitioned into a plurality of segments in a similar manner to the target map data;
    isolation detection means for detecting a presence or an absence of an isolated state in which some roads in the road network of the target map data are isolated from other roads in the road network of the target map data, the isolated roads being one road or two or more roads that form a closed-circuit route that is not connected to any other road in the vicinity of the road network of the target map data due to updating of one or more update target segments in the target map data based on the update map data;
    extraction means for extracting, as update required segments, segments of the update map data, other than the update target segments, that have a road that is connected to the isolated roads when the isolated state is detected; and
    update data file generating means for generating update data files for the update target segments and the update required segments based on the update map data, wherein
    when there is a deletion of a road in update contents of the update map data for the target map data, the isolation detection means detects, on the update target segments, the presence or the absence of the isolated state in relation to a road that was connected to the deleted road, and
    in a state after the one or more update target segments of the target map data have been updated based on the update map data, a search for a route connecting between both ends of the deleted road is performed, and when the route does not exist, the isolated state is detected.

2. The map update data supply apparatus according to claim 1, wherein, when there is an addition of a road in the update content of the update map data for the target map data, the extraction means extracts the update required segments from among segments that include the added road.

3. The map update data supply apparatus according to claim 2, wherein the extraction means extracts the update required segments such that the search for the route that connects one end of the deleted road to the other end thereof is carried out in a state that corresponds to a state after the update target segments in the target map data and at least one segment that includes the added road have been updated based on the update map data, and when there is a route that passes along the added road, segments that include the added road that structures the route are extracted as update required segments.

4. A map data update system that is structured to include a map update data supply apparatus that supplies an update data file for each segment of target map data that includes information for at least a road network and that is partitioned into a plurality of segments, wherein the map update data supply apparatus comprises:
    an update map database that stores update map data that is partitioned into a plurality of segments in a similar manner to the target map data;
    isolation detection means for detecting a presence or an absence of an isolated state in which some roads in the road network of the target map data are isolated from other roads in the road network of the target map data, the isolated roads being one road or two or more roads that form a closed-circuit route that is not connected to any other road in the vicinity of the road network of the target map data due to updating of one or more update target segments in the target map data based on the update map data;

extraction means for extracting, as update required segments, segments of the update map data, other than the update target segments, that have a road that is connected to the isolated roads when the isolated state is detected; and update data file generating means for generating update data files for the update target segments and the update required segments based on the update map data, wherein when there is a deletion of a road in update contents of the update map data for the target map data, the isolation detection means detects, on the update target segments, the presence or the absence of the isolated state in relation to a road that was connected to the deleted road and in a state after the one or more update target segments of the target map data have been updated based on the update map data a search for a route connecting between both ends of the deleted road is performed, and when the route does not exist, the isolated state is detected; and a navigation apparatus, wherein the navigation apparatus comprises:

a navigation map database that stores navigation map data serving as the target map data;

update request generating means for generating an update request data file for the update target segments;

update data file acquiring means for acquiring the update data files supplied from the map update data supply apparatus; and map data updating means for updating the navigation map data based on the update data files.

5. A map data update system that is structured to include a map update data supply apparatus that supplies an update data file for each segment of target map data that includes information for at least a road network and that is partitioned into a plurality of segments, wherein the map update data supply apparatus comprises:

an update map database that stores update map data that is partitioned into a plurality of segments in a similar manner to the target map data;

isolation detection means for detecting a presence or an absence of an isolated state in which some roads in the road network of the target map data are isolated from other roads in the road network of the target map data, the isolated roads being one road or two or more roads that form a closed-circuit route that is not connected to any other road in the vicinity of the road network of the target map data due to updating of one or more update target segments in the target map data based on the update map data;

extraction means for extracting, as update required segments, segments of the update map data, other than the update target segments, that have a road that is connected to the isolated roads when the isolated state is detected; and update data file generating means for generating update data files for the update target segments and the update required segments based on the update map data, wherein when there is a deletion of a road in update contents of the update map data for the target map data, the isolation detection means detects, on the update target segments, the presence or the absence of the isolated state in relation to a road that was connected to the deleted road and in a state after the one or more update target segments of the target map data have been updated based on the update map data a search for a route connecting between both ends of the deleted road is performed, and when the route does not exist, the isolated state is detected, wherein, when there is an addition of a road in the update content of the update map data for the target map data, the extraction means extracts the update required segments from among segments that include the added road, wherein the extraction means extracts the update required segments such that the search for the route that connects one end of the deleted road to the other end thereof is carried out in a state that corresponds to a state after the update target segments in the target map data and at least one segment that includes the added road have been updated based on the update map data, and when there is a route that passes along the added road, segments that include the added road that structures the route are extracted as update required segments; and a navigation apparatus, wherein the navigation apparatus comprises:

a navigation map database that stores navigation map data serving as the target map data;

update request generating means for generating an update request data file for the update target segments;

update data file acquiring means for acquiring the update data files supplied from the map update data supply apparatus; and map data updating means for updating the navigation map data based on the update data files.

6. A map update data supply method that supplies an update data file for each segment of target map data that includes information for at least a road network and that is partitioned into a plurality of segments, which executes:

an isolation detection step of detecting a presence or an absence of an isolated state in which some roads in the road network of the target map are isolated from other roads in the road network of the target map data due to updating of one or more update target segments in the target map data based on the update map data;

an extraction step of extracting, as update required segments, segments of the update map data, other than the update target segments, that have a road that is connected to the isolated the roads when the isolated state is detected; and an update data file generating step of generating update data files for the update target segments and the update required segments based on the update map data, wherein when there is a deletion of a road in update contents of the update map data for the target map data, the isolation detection step carries out a search for a route that connects one end of the deleted road and the other end thereof in a state that corresponds to a state after the update target segments in the target map data have been updated based on the update map data, and detects that there is the isolated state in the case where the route does not exist.

7. The map update data supply method according to claim 6, wherein, when there is an addition of a road in the update content of the update map data for the target map data, the extraction step carries out a search for a route that connects one end of the deleted road and the other end thereof in a state that corresponds to a state after the update target segments in the target map data and at least one segment that includes the added road have been updated based on the update map data, and when the route that passes along the added road is present, the extraction step extracts segments that include the added road that structures the route as update required segments.

* * * * *